United States Patent
Acarnley

[19]

[11] Patent Number: 6,005,364
[45] Date of Patent: Dec. 21, 1999

[54] ROTOR POSITION MEASUREMENT

[75] Inventor: Paul Philip Acarnley, Riding Mill, United Kingdom

[73] Assignee: BTG International Limited, London, United Kingdom

[21] Appl. No.: 08/951,626

[22] Filed: Oct. 16, 1997

Related U.S. Application Data

[63] Continuation of application No. 08/381,904, filed as application No. PCT/GB93/01703, Aug. 11, 1993, abandoned.

[30] Foreign Application Priority Data

Aug. 21, 1992 [GB] United Kingdom .................. 9217761

[51] Int. Cl.$^6$ ....................................................... H02P 1/46
[52] U.S. Cl. ........................................... 318/632; 318/701
[58] Field of Search ..................... 318/606, 254, 318/671, 696, 632, 701, 721, 761; 364/193

[56] References Cited

U.S. PATENT DOCUMENTS

| | | | |
|---|---|---|---|
| 4,267,499 | 5/1981 | Kurosawa | 318/800 |
| 4,491,775 | 1/1985 | Harvey et al. | 318/434 |
| 4,703,245 | 10/1987 | Sakamoto et al. | 318/809 |
| 4,780,657 | 10/1988 | Brown et al. | 318/805 |
| 4,885,518 | 12/1989 | Schauder | 318/807 |
| 4,885,520 | 12/1989 | Sugimoto et al. | 318/808 |
| 5,097,190 | 3/1992 | Lyons et al. | 318/701 |
| 5,107,195 | 4/1992 | Lyons et al. | 318/701 |
| 5,140,243 | 8/1992 | Lyons et al. | 318/701 |
| 5,140,244 | 8/1992 | Lyons | 318/701 |
| 5,186,332 | 2/1993 | Montagu | 318/128 |
| 5,334,923 | 8/1994 | Lorenz et al. | 318/804 |
| 5,459,386 | 10/1995 | Okachi et al. | 318/803 |
| 5,469,039 | 11/1995 | Stephenson et al. | 318/701 |

FOREIGN PATENT DOCUMENTS

9102401 2/1991 WIPO .

OTHER PUBLICATIONS

Proc Icem 1990, Boston US, pp. 1225–1230, R. Dhaouadi et al "Application Of Stochastic Filtering To A Permanent Magnet . . . " Cited In The Appln. p. 1.

19th Asilomar Conf. On Circuits, Systems & Computers Nov. 8, 1985, Pacific Grove CA. A. Lumsdaine et al "A State Observer For Variable Reluctance . . . " Cited in the Appln. p. 1.

IEEE Transactions on Industry Applications vol. 27, No. 5, Sep. 1991, New York–US pp. 1005–1011, Rusong Wu et al "A Permanent Magnet Motor . . . " cited in the application p. 2.

Chow et al. "Detection of a Variable Reluctance Machine's Rotor Position Using a Predictor Corrector Estimator" from Conference Proceedings of IEEE Southeastcon, pp. 523–528, Apr. 1988.

*Primary Examiner*—Robert E. Nappi
*Assistant Examiner*—Rina I. Duda
*Attorney, Agent, or Firm*—Pillsbury Madison & Sutro, LLP

[57] ABSTRACT

A motor monitoring and control circuit calculates a value parameter for a position of the motor at given instants. The same parameter (which may be position or speed of a rotor) is then measured at subsequent instants. These values are used to compute a future value of the parameter. The motor monitoring and control circuit is advantageous in that it can be used for any type of motor and can be easily and quickly fitted to a motor without the need for expensive and time consuming initial measurements and computations of characteristic properties of the motor in order to calibrate it. Similarly, automatic compensation is made during operation.

21 Claims, 9 Drawing Sheets

ROTOR POSITION MEASUREMENT

This application is a continuation of application Ser. No. 08/381,904 filed Feb. 13, 1995, abandoned, which was the national phase of International Application No. PCT/GB93/01703 filed Aug. 11, 1993.

FIELD OF THE INVENTION

This invention relates to a method of and apparatus for determining a rotor displacement parameter (such as position or speed) for an electric motor, and to an apparatus incorporating the electric motor. The invention has particular application to the continuous determination, by electrical rather than mechanical means, of rotor angular position, and the use of such position data in controlling the electric motor.

BACKGROUND OF THE INVENTION

Many types of electric motors incorporate an electronic commutator which adjusts the winding excitation according to the instantaneous position of the rotor. The position of the rotor may be determined mechanically, but is advantageously deduced from the motor's current and voltage waveforms. Mechanical determination can involve complex and expensive equipment, and may detrimentally affect the rotor's inertia and friction characteristics.

A paper entitled "Application of stochastic filtering to a permanent magnet synchronous motor-drive system without electro-mechanical sensors", by Dhaouadi, R. et al. (Proc. ICEM, Boston, 1990) discloses a method of determining rotor position which involves detecting electrical characteristics (phase voltages and currents) of the motor at given instants and estimating rotor position from these characteristics using an extended Kalman filter algorithm. An initial estimate of rotor position is provided by solving the mechanical equation of motion for the rotor. Phase flux linkage, the value for which is utilised in the determination of rotor position, is modelled as being linearly dependent on phase current.

A paper entitled "A state observer for variable reluctance motors: analysis and experiments", by Lumsdaine, A. et al. (Proc. ASILOMAR Conference on Circuits, Systems and Computers, Pacific Grove, 1985) discloses a similar method in which rotor position is estimated from the electrical characteristics using a state observer model.

The disadvantages with these techniques are that they are limited to specific types of electric motor and that they are limited to specific operating condition ranges.

The present invention seeks to solve these problems. In its various aspects, the invention provides techniques which can be applied to virtually any type of motor having phase flux linkage varying with rotor position. Such motor types include switched and variable reluctance motors, hybrid stepping motors, permanent magnet synchronous motors, brushless alternating and direct current motors, and sinusoidal and trapezoidal permanent magnet motors. In particular, the invention can be applied to any motor which is controlled in dependence on rotor position (so called "rotor position switched drives"). Other arrangements are described below.

International Patent Application No. PCT/SE90/00498 describes an arrangement in which magnetic flux in a motor is compared with tabulated values of a non linear function of magnetic flux with respect to current.

IEEE Transactions on Industry Applications Vol. 27 No. 5 pages 1005–1011 describes a controller for use to control motor speed without the need for a sensor. Two line voltages and stator currents are employed to compute a flux linkage space vector. An indication of angular velocity is then computed using the phase angle of the vector and the rate of change of flux linkage.

U.S. Pat. No. 5,107,195 describes an apparatus and method which simultaneously senses phase current and phase flux, determines the reluctance of the stator-to-rotor air gap and evaluates the position of the rotor phase with respect to the stator pole tips.

SUMMARY OF THE INVENTION

According to a first aspect of the present invention, there is provided a method of determining a rotor displacement parameter (such as position or velocity) of an electric motor, comprising detecting electrical characteristics of the motor at given instants, determining values of the parameter for previous instants in dependence on the characteristics of the motor at these instants, and predicting an updated value of the parameter by extrapolation from values for previous instants.

By predicting an updated value of the parameter by extrapolation, rather than, as in the prior art, by solving the equation of motion for the rotor, the present invention can provide an estimate of the value which is not dependent directly on the mechanical properties of the motor. This has several advantages. Firstly, these properties do not have to be predetermined at any stage. Secondly, if (as is often the case) the mechanical properties of the motor (such as inertia, friction or load torque) actually change during operation, account is automatically taken of these changes.

Preferably, the updated predicted parameter value is corrected in dependence on the difference between the actual value of an electrical characteristic and a value determined using the updated parameter value. It has been found that such a "predictor/corrector" technique can provide a simple and accurate estimate of the parameter.

For the sake of accuracy, the updated value may be predicted from respective values at at least three previous instants, preferably the three immediately preceding instants. It may be predicted in accordance with an equation of the form $a_k = 3a_{k-1} - 3a_{k-2} + a_{k-3}$, where $a_k$ is the updated value, and $a_{k-1}$, $a_{k-2}$ and $a_{k-3}$ are the values of the parameter at three preceding instants.

According to a second aspect of the present invention, there is provided a method of determining a rotor displacement parameter for an electric motor, comprising detecting an electrical characteristic of the motor at a given instant, predicting a value representative of flux linkage from the characteristic, correcting the predicted flux linkage value in dependence on the difference between the actual value of the characteristic and a value estimated using the predicted flux linkage value, and determining the rotor displacement parameter sing the corrected flux linkage value.

This invention arises from the discovery, pursuant to the present invention, that such flux linkage correction can be important in reducing inaccuracies in the estimation of rotor position. This is because flux linkage is conventionally determined from measured voltage and current values by integration. Measurement and other errors can cause the flux linkage values to drift, unless corrected.

It will be appreciated that the corrected flux linkage value may not be used in the determination of the rotor displacement parameter at the given instant. In the preferred embodiment, in fact, the corrected value is not so used until the next instant at which a determination of the parameter is effected.

Two alternative ways of correcting flux linkage values are described later. One involves comparing directly measured values of current and values estimated using the predicted flux linkage value. The other involves a comparison between mechanical and electrical estimates of rotor position which implicitly involves a comparison between measured and predicted current values.

Whichever alternative is adopted, it is preferred that the correction is determined in dependence on said difference multiplied by the differential of flux linkage with respect to current. The dependence may either be directly on said difference multiplied by the differential of flux linkage with respect to current, or may be indirect, via the differential of flux linkage with respect to rotor position multiplied by the difference between the two estimates of rotor position. Such an arrangement can provide a simple but effective way of correcting flux linkage.

Preferably again the correction is determined from the difference between the actual and estimated values of such electrical characteristic for a plurality of phases of the motor. Employing information from some or possibly even all of the phases of the motor rather than just one phase can ensure a more accurate estimate of the rotor displacement parameter.

According to a third aspect of the present invention, there is provided a method of determining a rotor displacement parameter for an electric motor, including detecting an electrical characteristic of the motor at a given instant, and determining a value of the parameter in dependence on the detected characteristic, the determination taking into account magnetic saturation experienced by the motor.

This aspect of the invention arises from the discovery, pursuant to the present invention, that magnetic saturation is a phenomenon which may in many circumstances need to be taken into account if an accurate estimate of the rotor displacement parameter is to be made. Magnetic saturation manifests itself as a divergence at higher phase currents from the linear dependence of phase flux linkage on phase current at lower phase currents. Many motors are designed to operate at least partly in the saturation region. It has been discovered that for such motors a model of motor behaviour in which flux linkage is only a linear function of current can produce considerable inaccuracies in the estimates of the rotor displacement parameter.

Preferably, the parameter is determined in dependence on the differential of flux linkage with respect to current, since this is a particularly important way in which magnetic saturation can be taken into account. More preferably, the parameter is determined in dependence on the differentials with respect to current of the flux linkages for a plurality of phases of the motor. This can lead to a yet more accurate estimate of rotor position; information from some or all of the phases, including appropriate flux linkage cross-coupling terms, may in fact often need to be taken into account if an accurate estimate is to be made.

Values of the differential of flux linkage with respect to current can be provided by storing some representation of flux linkage, or its differential with respect to current, as a function of current and rotor position. Such information can also be useful in providing an estimate of current from calculated flux linkage values. This estimate can be compared with measured values of current and the comparison used in determining the value of the rotor displacement parameter.

The invention extends to a method, for controlling the electric motor, wherein the motor is controlled in dependence on the value of the rotor displacement parameter. The rotor displacement parameter information may alternatively or additionally be output as an output signal, for example, to be used for displaying rotor position or speed.

The invention also extends to a method, which could be independent of the other aspects of the invention, for determining a rotor displacement parameter for an electric motor having a plurality of windings sharing a common connection, wherein the electrical characteristics are detected from points other than the common connection. This aspect of the invention stems from the discovery, pursuant to the present invention, that, for determining the rotor displacement parameter, the electrical characteristics need only be detected at the external or outer nodes of the windings, and not at their common connection. This is advantageous since the common connection on motor windings is often inaccessible. This aspect of the invention has particular relevance to a motor having star-connected windings.

Apparatus features analogous to the method features described above are also provided by the invention. In particular, the invention extends to apparatus for determining a rotor displacement parameter for an electric motor and incorporating said electric motor.

The various aspects of the invention may be provided in any combination one with another.

BRIEF DESCRIPTION OF THE DRAWINGS

Preferred features of the invention, the theory underlying the invention, and examples of the operation of the invention are now described with reference to the accompanying drawings, in which.

DETAILED DESCRIPTION OF THE PREFERRED EMBODIMENTS

A basic embodiment of the invention relating to a permanent magnet (PM) motor is first described, followed by a more generally applicable modified embodiment. In both embodiments, a predictor/corrector technique is employed to determine the angular position of the rotor of an electric motor. Such a technique requires a mathematical model (an "observer") of the relevant characteristics of the motor. For each embodiment, the model is described first, and then the use of that model in the determination of rotor position is described.

MOTOR MODEL FOR THE BASIC EMBODIMENT

Considering firstly the model for the basic embodiment, the voltage equation for a 3-phase balanced PM alternating current motor are expressed in matrix form as:

$$\begin{bmatrix} v_1 \\ v_2 \\ v_3 \end{bmatrix} = \begin{bmatrix} R & 0 & 0 \\ 0 & R & 0 \\ 0 & 0 & R \end{bmatrix} \begin{bmatrix} i_1 \\ i_2 \\ i_3 \end{bmatrix} + \frac{d}{dt} \begin{bmatrix} \psi_1 \\ \psi_2 \\ \psi_3 \end{bmatrix} \quad (1)$$

where $v_1$, $v_2$ and $v_3$ are the phase voltages, R is the resistance of the stator winding, $i_1$, $i_2$ and $i_3$ are the phase currents, and $\psi_1$, $\psi_2$ and $\psi_3$ are the phase flux linkages of the windings.

The general flux linkage variables may be defined in the form:

$$\begin{bmatrix} \psi_1 \\ \psi_2 \\ \psi_3 \end{bmatrix} = \begin{bmatrix} L_{11}(\theta) & M_{12}(\theta) & M_{13}(\theta) \\ M_{21}(\theta) & L_{22}(\theta) & M_{23}(\theta) \\ M_{31}(\theta) & M_{32}(\theta) & L_{33}(\theta) \end{bmatrix} \begin{bmatrix} i_1 \\ i_2 \\ i_3 \end{bmatrix} - \begin{bmatrix} \lambda_m(\theta) \\ \lambda_m\left(\theta - \frac{2\pi}{3}\right) \\ \lambda_m\left(\theta - \frac{4\pi}{3}\right) \end{bmatrix} \quad (2)$$

Here, $\theta$ is electrical angular position, $\lambda_m$, the magnet flux linkage, is a function of $\theta$, $L_{xx}(\theta)$ is the self inductance of winding x, and $M_{xy}(\theta)$ is the mutual inductance between two windings x and y.

It will be appreciated that the inductance matrix in Equation 2 describes the self and mutual inductance relationships of the stator phases of a symmetrical PM motor. Differentiating Equation 2, substituting it into Equation 1, and rearranging, $$\begin{bmatrix} v_1 \\ v_2 \\ v_3 \end{bmatrix} - \begin{bmatrix} R & 0 & 0 \\ 0 & R & 0 \\ 0 & 0 & R \end{bmatrix} \begin{bmatrix} i_1 \\ i_2 \\ i_3 \end{bmatrix} = \begin{bmatrix} L_{11}(\theta) & M_{12}(\theta) & M_{13}(\theta) \\ M_{21}(\theta) & L_{22}(\theta) & M_{23}(\theta) \\ M_{31}(\theta) & M_{32}(\theta) & L_{33}(\theta) \end{bmatrix} \cdot \frac{d}{dt} \begin{bmatrix} i_1 \\ i_2 \\ i_3 \end{bmatrix} + \frac{d}{dt} \begin{bmatrix} L_{11}(\theta) & M_{12}(\theta) & M_{13}(\theta) \\ M_{21}(\theta) & L_{22}(\theta) & M_{23}(\theta) \\ M_{31}(\theta) & M_{32}(\theta) & L_{33}(\theta) \end{bmatrix} \begin{bmatrix} i_1 \\ i_2 \\ i_3 \end{bmatrix} - \frac{d}{dt} \begin{bmatrix} \lambda_m(\theta) \\ \lambda_m\left(\theta - \frac{2\pi}{3}\right) \\ \lambda_m\left(\theta - \frac{4\pi}{3}\right) \end{bmatrix} \quad (3)$$

For a machine which has no variable inductance, Equation 3 can be rearranged to give more simple system equations. Linear 3-phase coupled systems are magnetically symmetrical if the diagonal elements of the inductance matrix are equal. Assuming further that there is no change in the rotor reluctance with angle, then:

$$L_{11} = L_{22} = L_{33} = L_1$$

$$M_{12} = M_{21} = M_{13} = M_{31} = M_{23} = M_{32} = M_1 \quad (4)$$

In the star-connected with isolated star point motor:

$$i_1 + i_2 + i_3 = 0 \quad (5)$$

Hence, $$\begin{bmatrix} \psi_1 \\ \psi_2 \\ \psi_3 \end{bmatrix} = \begin{bmatrix} L & 0 & 0 \\ 0 & L & 0 \\ 0 & 0 & L \end{bmatrix} \begin{bmatrix} i_1 \\ i_2 \\ i_3 \end{bmatrix} - \begin{bmatrix} \lambda_m(\theta) \\ \lambda_m\left(\theta - \frac{2\pi}{3}\right) \\ \lambda_m\left(\theta - \frac{4\pi}{3}\right) \end{bmatrix} \quad (6)$$

where $L = L_1 - M_1$

Differentating Equation 6, substituting into Equation 1 and rearranging, $$\begin{bmatrix} v_1 \\ v_2 \\ v_3 \end{bmatrix} - \begin{bmatrix} R & 0 & 0 \\ 0 & R & 0 \\ 0 & 0 & R \end{bmatrix} \begin{bmatrix} i_1 \\ i_2 \\ i_3 \end{bmatrix} = \begin{bmatrix} L & 0 & 0 \\ 0 & L & 0 \\ 0 & 0 & L \end{bmatrix} \cdot \frac{d}{dt} \begin{bmatrix} i_1 \\ i_2 \\ i_3 \end{bmatrix} - \frac{d}{dt} \begin{bmatrix} \lambda_m(\theta) \\ \lambda_m\left(\theta - \frac{2\pi}{3}\right) \\ \lambda_m\left(\theta - \frac{4\pi}{3}\right) \end{bmatrix} \quad (7)$$

As explained in later sections, position estimation based on the flux linkages is achieved by Equation 2 or Equation 6 according to whether the machine has variable winding inductances or constant inductances. Direct measurement of phase current and phase voltage can allow estimation of the flux linkage. If the terminal phase voltages of the motor are sensed and stator voltage drops are subtracted, the change of the flux linkage of each phase with time can be determined in terms of the rotor position, phase currents, and other motor parameters which appear in the right-hand side of Equation 3 and Equation 7.

ROTOR POSITION DETERMINATION FOR THE BASIC EMBODIMENT

The manner in which the above-described model is used to determine rotor position is now described with reference to FIGS. 1 and 2.

Figure 1:
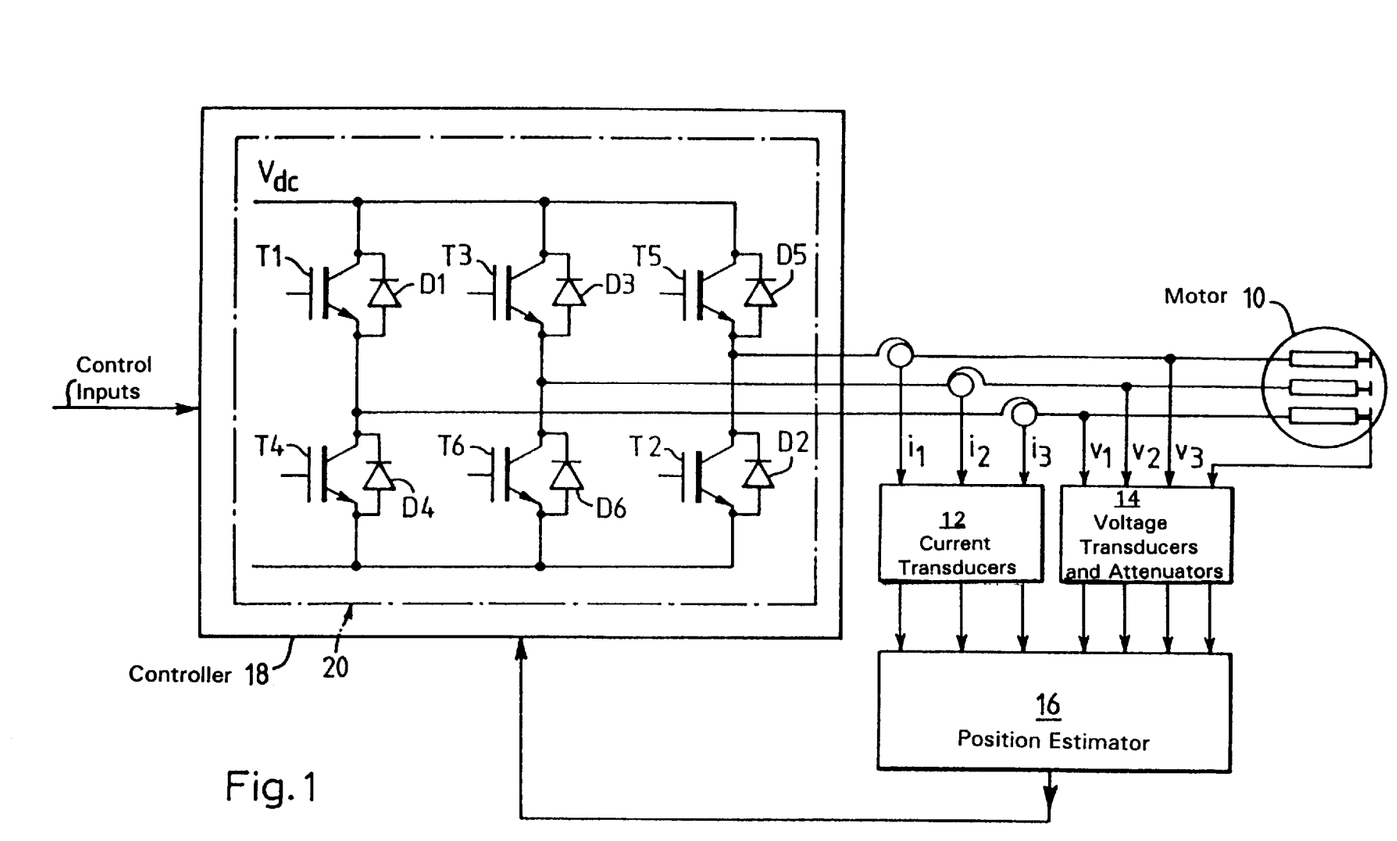
FIG. 1 is a block diagram of apparatus for determining rotor position for an electric motor.

Referring first to FIG. 1, apparatus for determining rotor position for an electric motor and thence controlling the electric motor comprises a permanent magnet 3-phase motor 10, a set of current transducers 12, a set of voltage transducers and attenuators 14, a position estimator 16, and a controller 18 responsive to control inputs and including a 3-phase inverter circuit 20 for providing a 3-phase power supply. The inverter circuit 20 comprises three pairs of transistors T1–T6 and associated diodes D1–D6. In the preferred embodiment, the base or gate of each transistor is provided with control signals from a hysteresis current controller. The motor 10 is driven in response to the control inputs passed to the controller 18. The controller utilises rotor position information from the rotor position estimator 16 to determine how power should be distributed to the three phases of the motor.

The operation of the position estimator 16 is now illustrated with reference to FIG. 2. In overview, the position estimator provides, at each new time instant, fresh phase flux linkage and position estimates. In FIG. 2, estimated values of quantities are designated by subscript "e" whilst measured values are designated by subscript "m". The position estimator 16 is implemented, in the present embodiment, either by a Digital Signal Processor (DSP), or by an Application-Specific Integrated Circuit (ASIC) in conjunction with appropriate means for storing the information required for the operation of the position estimator. The operation of the position estimator is now described in more detail.

Flux Linkage Prediction

Firstly (see the INTEGRATOR box) the phase currents $i_1$, $i_2$ and $i_3$ and voltages $v_1$, $v_2$ and $v_3$ measured using the current and voltage transducers 12 and 14 are used to predict the phase flux linkages $\psi_1$, $\psi_2$ and $\psi_3$ of the motor. It is apparent from Equation 1 that the function of flux linkage to be evaluated is of the following form:

$$\begin{bmatrix} \psi_1(t) \\ \psi_2(t) \\ \psi_3(t) \end{bmatrix} = \int_0^t \left( \begin{bmatrix} v_1(\tau) \\ v_2(\tau) \\ v_3(\tau) \end{bmatrix} - \begin{bmatrix} R & 0 & 0 \\ 0 & R & 0 \\ 0 & 0 & R \end{bmatrix} \begin{bmatrix} i_1(\tau) \\ i_2(\tau) \\ i_3(\tau) \end{bmatrix} \right) d\tau \qquad (8)$$

In general, the function of $(v(\tau)-Ri(\tau))$ does not have a closed form integral. Although, for cases where extremely high accuracy is required, different integration methods can be used, the relatively simple method employed in the present embodiment is integration by the rectangular rule:

$$\psi_{n(k)} = \Delta T[v_{n(k)} - Ri_{n(k)}] + \psi_{n(k-1)} \, n=1,2,3 \ k=1,2, \qquad (9)$$

where $\Delta T$ is the sampling interval and n is the number of phases in the motor. The estimates of flux linkage are designated on FIG. 2 as $\psi_{1e(k)}$, $\psi_{2e(k)}$, and $\psi_{3e(k)}$.

Since the integration starts at k=1, $\psi_n(0)$ plays the role of the initial condition. In PM machines, the initial value of flux linkage is defined by the position of the magnet. Therefore, to evaluate Equation 9 and to set up the initial condition, the rotor can be brought to a known position which defines the initial values ($\psi_n(0)$) of the integration.

Rotor Position Prediction

Next (see the POSITION CORRECTION AND POSITION ESTIMATION & PREDICTION box) a first estimate ($\underline{\theta}_{e(k)}$) of rotor position is provided for a new time k using an extrapolation technique. The mechanical equations of motion for the motor can be written:

$$T = \frac{1}{p} \left[ J \frac{d^2\theta}{dt^2} + B \frac{d\theta}{dt} + T_1 \right] \qquad (10)$$

where T is the motor torque, p is the number of rotor pole pairs, J is the motor inertia, B is the motor friction and $T_1$ is the load torque. It can be seen from the equation that the position of the rotor changes as a second order function. Therefore, a second-order polynomial in time is fitted to the previous known rotor positions $\theta_{e(k-1)}$, $\theta_{e(k-2)}$ and $\theta_{e(k-3)}$ at times k-1, k-2 and k-3:

$$\theta = at^2 + bt + c \qquad (11)$$

It will be appreciated that the fit is exact in the cases of constant speed and constant acceleration. Then, with t=0 at time step k-3:

$$\theta_{e(k-3)} = c; \; \theta_{e(k-2)} = a(\Delta T)^2 + b\Delta T + c;$$

$$\theta_{e(k-1)} = 4a(\Delta T)^2 + 2b\Delta T + c; \text{ and } \theta_{e(k)} = 9a(\Delta T)^2 + 3b\Delta T + c \qquad (12)$$

Eliminating the polynomial coefficients and solving for $\theta_{e(k)}$ gives the first estimate for the latest rotor position:

$$\underline{\theta}_{e(k)} = 3\theta_{e(k-1)} - 3\theta_{e(k-2)} + \theta_{e(k-3)} \qquad (13)$$

It will be appreciated that alternative extrapolation techniques (for example, higher order polynomials) to that described above could be used.

Current Estimation

Next (see the first CURRENT ESTIMATION box) a first estimate of phase current ($\underline{i}_1$, $\underline{i}_2$ and $\underline{i}_3$) is made based on the first estimate of rotor position and the estimate of flux linkage. If the simplifying assumptions underlying Equation 6 hold, then phase current can be estimated as follows:

$$\underline{i}_{1e} = [\psi_{1e} + \lambda_m(\underline{\theta}_e)]/L$$

$$\underline{i}_{2e} = [\psi_{2e} + \lambda_m(\underline{\theta}_e - 2\pi/3)]/L$$

$$\underline{i}_{3e} = [\psi_{3e} + \lambda_m(\underline{\theta}_e - 4\pi/3)]/L \qquad (14)$$

The relevant values of $\lambda_m$ are determined from a stored representation (such as a look-up table or predetermined analytical function) which expresses $\lambda_m$ in terms of $\theta$. Often, $\lambda_m$ varies sinusoidally or trapezoidally with $\theta$.

Alternatively, phase current may need to be determined from the more general Equation 2, using stored representations of $L_{xx}$ and $M_{xy}$ as functions of $\theta$ as well as $\lambda_m$ as a function of $\theta$.

The first phase current estimates ($\underline{i}_{1e}$, $\underline{i}_{2e}$ and $\underline{i}_{3e}$) from the first CURRENT ESTIMATION box are compared with the actual measured phase currents to give a first estimate of the current errors:

$$\Delta \underline{i}_1 = i_{1m} - \underline{i}_{1e}$$

$$\Delta \underline{i}_2 = i_{2m} - \underline{i}_{2e}$$

$$\Delta \underline{i}_3 = i_{3m} - \underline{i}_{3e} \qquad (15)$$

Rotor Position Correction

The next stage in the predictor/corrector technique (see again the POSITION CORRECTION AND POSITION ESTIMATION & PREDICTION box) is to update the predicted rotor position value (the first estimate, $\underline{\theta}_e$) to yield a corrected rotor position value (the second estimate, $\theta_e$). Assuming that the flux linkage estimate is correct, and that the errors in the estimated phase currents are due to errors in rotor position, then the corrected position is determined as that position which minimises the current errors. As can be seen from Equation 2, flux linkage is a function of several variables, such that $\psi = \psi(\theta, i_1, i_2, i_3)$. Changes in flux linkage occur as a result of changes in current and position, so that, for phase n:

$$\Delta \psi_{ne} = \frac{\partial \psi_{ne}}{\partial i_1} \Delta i_1 + \frac{\partial \psi_{ne}}{\partial i_2} \Delta i_2 + \frac{\partial \psi_{ne}}{\partial i_3} \Delta i_3 - \frac{\partial \psi_{ne}}{\partial \theta_e} \Delta \theta \qquad (16)$$

where $\Delta \theta$ is the position error, equal to $\theta_e - \underline{\theta}_e$. Given the above assumption that the flux linkage estimate is correct (that is, $\Delta \psi_{ne} = 0$), we have, for each phase:

$$\Delta \theta = \left( \frac{\partial \psi_{ne}}{\partial i_1} \Delta i_1 + \frac{\partial \psi_{ne}}{\partial i_2} \Delta i_2 + \frac{\partial \psi_{ne}}{\partial i_3} \Delta i_3 \right) \bigg/ \left( \frac{\partial \psi_{ne}}{\partial \theta_e} \right) \qquad (17)$$

The partial derivatives of flux linkage with respect to current and rotor position are evaluated from stored representations (such as look-up tables or predetermined analytical functions) of the appropriate functions. For many types of motor, Equation 17 can be simplified by neglecting all the $\partial \psi / \partial i$ terms except $\partial \psi_{ne} / \partial i_n$.

It will be appreciated that, by determining the position error in dependence on the differential of flux linkage with respect to current, the effects of magnetic saturation (that is, non-linearities in the $\psi$ versus i curve) can be taken into account.

Equation 17 yields a set of three position corrections ($\Delta \theta_1$, $\Delta \theta_2$ and $\Delta \theta_3$). A single revised position estimate is obtained by taking the average of the three corrections:

$$\Delta\theta_{(k)} = \frac{\Delta\theta_{1(k)} + \Delta\theta_{2(k)} + \Delta\theta_{3(k)}}{3} \tag{18}$$

At certain phase current levels and rotor positions some of the phases are better indicators of position error than others. Therefore the position error averaging may incorporate weighting factors which are current and position dependent. The weighting factors may even be selected to neglect completely position correction information from certain phases at certain instants. A corrected position is calculated by adding the position error to the previous predicted position:

$$\theta_{(k)} = \theta_{e(k)} = \underline{\theta}_{e(k-1)} + \Delta\theta_{(k)} \tag{19}$$

Figure 2:
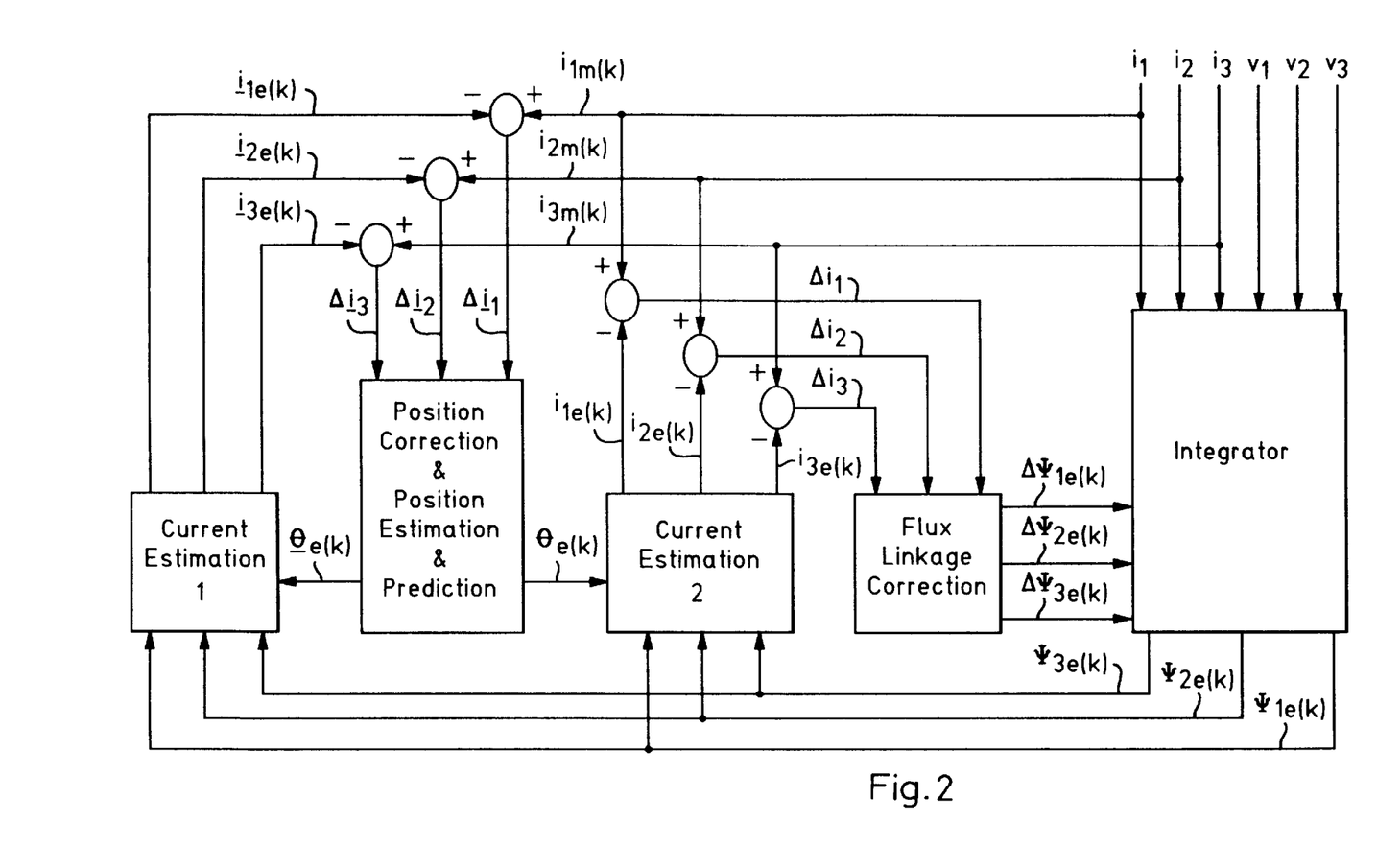
FIG. 2 is a block diagram representing a method of determining rotor position.

As clearly seen in FIG. 2, an outer current loop is used to estimate the phase current; predicted position is utilised with estimated flux linkage for the current estimation. A position prediction is obtained by extrapolation from position data at previous time intervals.

Flux Linkage Correction

The final stage of the algorithm is to pass updated, corrected flux linkage values to the INTEGRATOR box. Such values need to be updated because the continuous estimation of flux linkage using an integration process creates unwanted effects in the flux linkage waveform. Measurement errors, due to noise, offsets and the temperature dependence of the winding resistance produce flux linkage errors, which then contribute to position estimation errors. However, some filtering and error correction are provided by updating the flux linkage estimates after the position estimate has been corrected. This updating is provided in a loop comprising the second CURRENT ESTIMATION, the FLUX LINKAGE CORRECTION and the INTEGRATOR boxes.

Updating proceeds as follows. First (see the second CURRENT ESTIMATION box) a second, revised estimate of the current errors ($\Delta i_1$, $\Delta i_2$ and $\Delta i_3$) is made in the same way as the first estimate of the current errors (that is, using Equations 2 or 6, 14 and 15), except that the corrected rotor position ($\theta_e$) is employed instead of the predicted position ($\underline{\theta}_e$). Then (see the FLUX LINKAGE CORRECTION box) the flux linkage estimates ($\psi_{1e}$, $\psi_{2e}$ and $\psi_{3e}$) are updated using the corrected rotor position ($\theta_e$) and the second, revised estimate of the current errors, in accordance with the principles underlying Equation 16. Thus, assuming that the errors in the flux linkage occur only because of current estimation errors, the corrections $\Delta\psi_{1e}$, $\Delta\psi_{2e}$ and $\Delta\psi_{3e}$ to the flux linkages are determined as follows:

$$\Delta\psi_{ne} = \frac{\partial\psi_{ne}}{\partial i_1}\Delta i_1 + \frac{\partial\psi_{ne}}{\partial i_2}\Delta i_2 + \frac{\partial\psi_{ne}}{\partial i_3}\Delta i_3 \quad n = 1, 2, 3 \tag{20}$$

The values of the estimated flux linkage error are then passed to the INTEGRATOR box to update the integration.

A simplified procedure for updating the flux linkage is to set the $\Delta i$'s to zero in Equation 16 and determine the corrections to the flux linkages from the following equation:

$$\Delta\psi_{ne} = -\left(\frac{\partial\psi_{ne}}{\partial\theta_{ne}}\right)\Delta\theta_n \quad n = 1, 2, 3 \tag{21}$$

where $\theta_e$ and $\Delta\theta_n$ refer to the corrected rotor position. It will be appreciated that the alternative procedures outlined in relation to Equations 20 and 21 are in fact closely related.

MOTOR MODEL FOR THE MODIFIED EMBODIMENT

Figure 3:
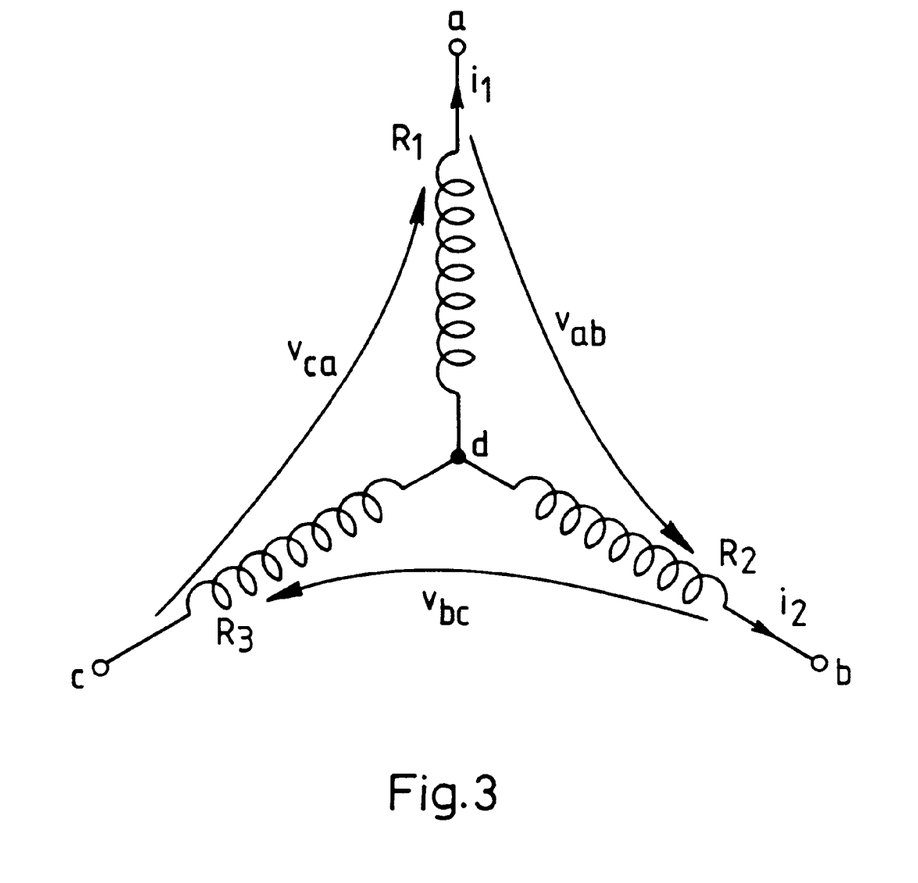
FIG. 3 is a sketch of star-connected windings of an electric motor.
Figure 4A:
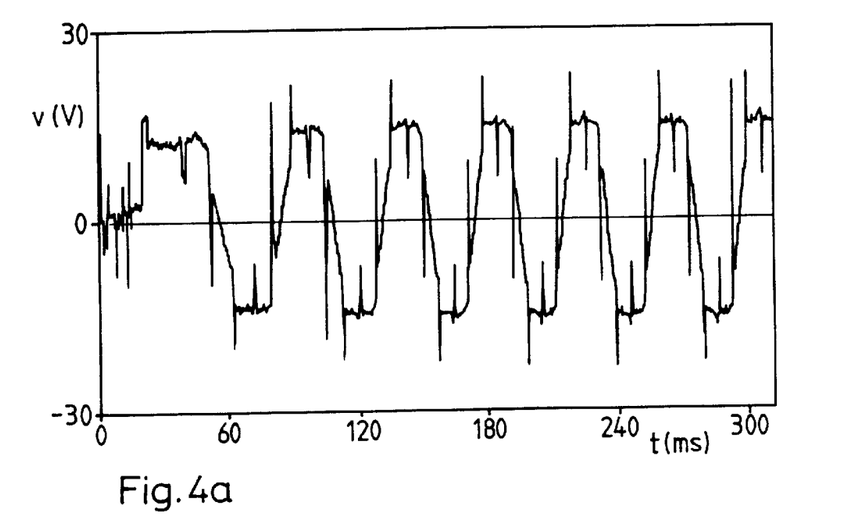
FIGS. 4 show experimental results obtained using the present invention for an electric motor accelerating from rest with no current control.
Figure 4B:
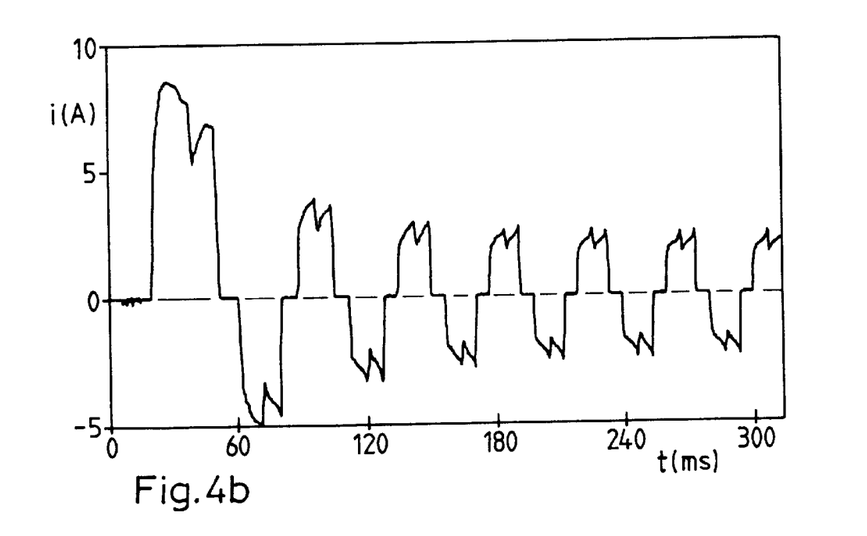
Figure 4C:
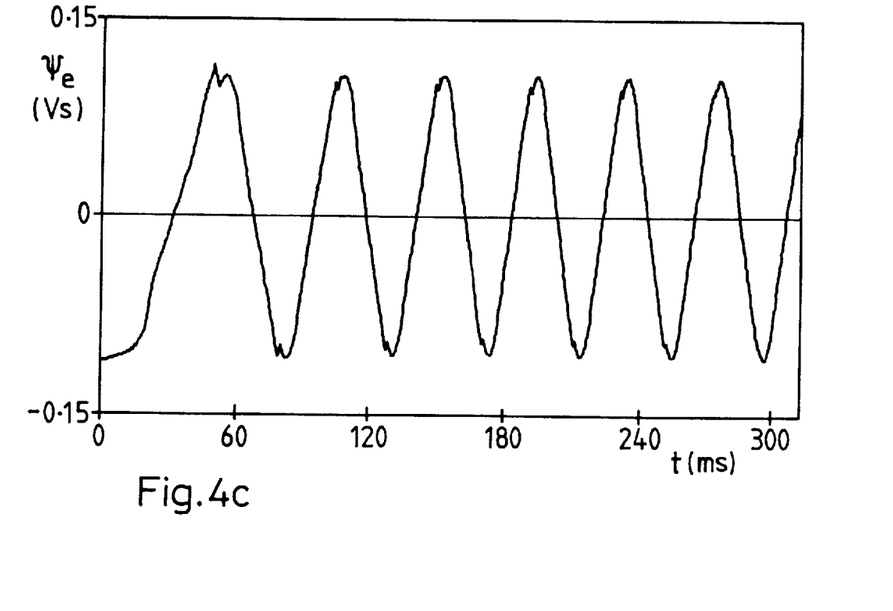
Figure 4D:
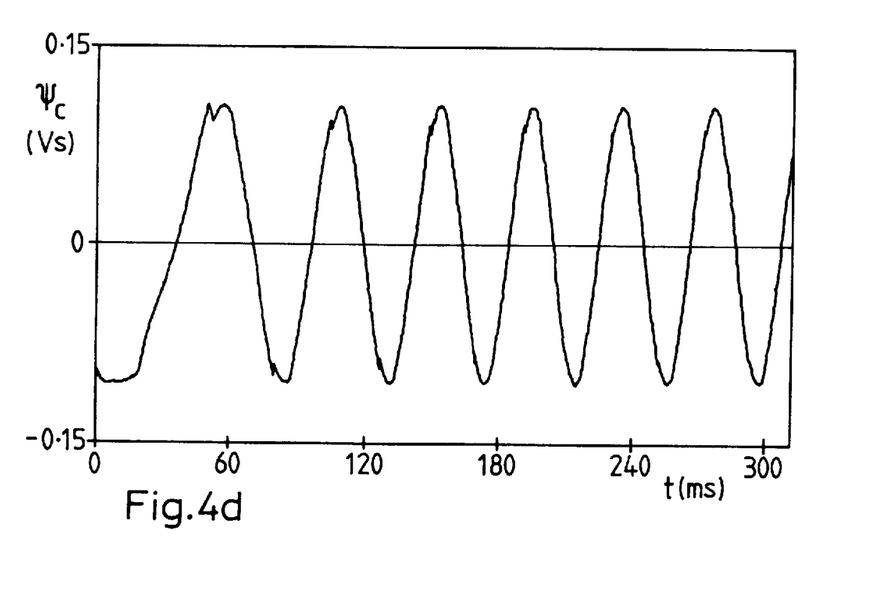
Figure 4E:
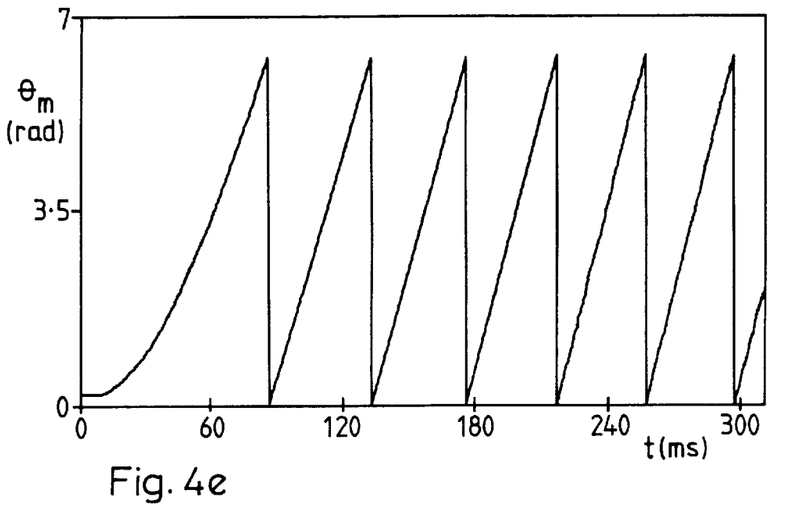
Figure 4F:
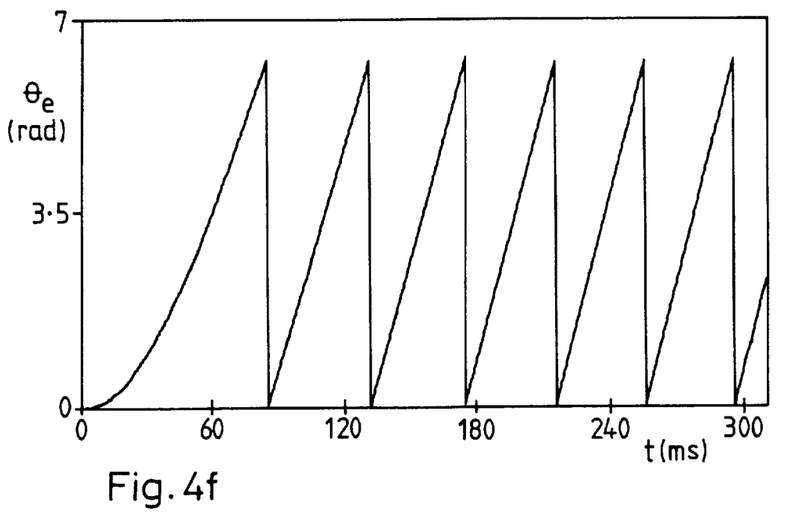

A modified version of the basic embodiment is now described. This version is applicable to any class of motor for which flux linkage is a function of rotor position. Considering firstly the model for the modified embodiment, the voltage equation for an n-phase machine may be written in the general form (compare with Equation 1 of the basic embodiment):

$$v_j = \sum_{q=1}^{m} R_q i_q + \frac{d\psi_j}{dt} \quad j = 1\ldots n \tag{22}$$

where $v_j$ is the voltage across m series-connected phase windings carrying currents $i_1 \ldots i_m$ and having resistances $R_1 \ldots R_m$, and $\psi_j$ the total flux linking the m windings. Thus, for instance, in the star-connected three-phase winding configuration shown in FIG. 3 (the three windings having a common connection at node d), the three voltages $v_j$ are $v_{ab}$, $v_{bc}$ and $v_{ca}$ respectively. The currents $i_q$ and resistances $R_q$ are the currents $i_1$, $i_2$ and $i_3$ and the resistances $R_1$, $R_2$ and $R_3$ respectively. Thus no voltage or current information is required to be measured at node d if the formulation of Equation 22 is used.

In general, $\psi_j$ is a function of the n phase currents $i_1 \ldots i_n$ and rotor position $\theta$ (compare with Equation 2 of the basic embodiment):

$$\psi_j = \psi_j(i_1, \ldots i_n, \theta) \tag{23}$$

ROTOR POSITION DETERMINATION FOR THE MODIFIED EMBODIMENT

The above general model can be applied in the following way to determine rotor position. Equation 22 can be re-arranged to show how the flux linking the jth combination of m windings can be estimated, using measurements of the voltage, $v_j$, and phase currents $i_1 \ldots i_m$ (compare with Equation 8 of the basic embodiment):

$$\psi_j = \int_{-\infty}^{t}\left(v_j - \sum_{q=1}^{m} R_q i_q\right) \cdot dt \tag{24}$$

For sampling at discrete time intervals of duration $\Delta T$, Equation 24 may be re-written (compare with Equation 9 of the basic embodiment):

$$\psi_{j(k)} = \Delta T\left(v_{j(k)} - \sum_{q=1}^{m} R_q i_{q(k)}\right) + \psi_{j(k-1)} \quad k = 1, 2\ldots \tag{25}$$

so that the estimate of flux linkage $\psi_{j(k-1)}$ at time $(k-1)\Delta T$ can be utilised to estimate $\psi_{j(k)}$ at time $k\Delta T$.

Estimates of rotor position at time $k\Delta T$ may be obtained by fitting a polynomial function to rotor position values at previous time intervals and extrapolating in exactly the same manner as described in relation to the basic embodiment (see the description relating to the POSITION CORRECTION AND POSITION ESTIMATION & PREDICTION box).

At time instant k estimates of n flux linkages $\psi_{j(k)}$ (j=1 ... n) are produced, together with a first estimate of rotor position, $\underline{\theta}_e$. For any motor, the functional relationship between flux linkage, current and position, expressed by Equation 23, can be predetermined. Therefore, in the present embodiment, given the estimates of flux linkages $\psi_j$ and position $\underline{\theta}_e$, the set of phase currents $\underline{i}_{je}$ is estimated using stored representations of flux linkage as a function of rotor position and phase current. Where the functional relationship in Equation 23 is simple, this process may involve no more than the solution of a set of n simultaneous linear equations or an even simpler set of equations of the form given in Equations 14. However, more complex flux linkage functions may lead to a requirement for the iterative solution of a set of n non-linear equations.

It will be appreciated that, by estimating current using a stored representation of flux linkage as a function of phase current, the effects of magnetic saturation (that is, non-linearities in the $\psi$ versus i curve) can be taken into account.

Given first estimates of phase current $\underline{i}_{je}$, a first estimate of the current errors is determined by comparing estimated and measured currents (see the first CURRENT ESTIMATION box and compare with Equations 15):

$$\Delta i_j = i_{jm} - i_{je} \quad (26)$$

Errors in current arise from errors in flux linkage and rotor position. It can be deduced from Equation 23 that:

$$\Delta \psi_{je} = \left( \sum_{q^1=1}^{n} \left( \frac{\partial \psi_{je}}{\partial i_{q^1}} \right) \cdot \Delta i_q^1 \right) + \left( \frac{\partial \psi_{je}}{\partial \theta} \right) \cdot \Delta \theta_j \quad (27)$$

where $\Delta \theta_j$ is the error in rotor position derived from consideration of winding set j. This equation is analogous to Equation 16.

Considering now the POSITION CORRECTION AND POSITION ESTIMATION & PREDICTION box, assuming initially that the set of flux linkage estimates is correct ($\Delta \psi_{je}=0$), Equation 27 leads to a set of n position corrections $\Delta \theta_j$ (j=1 . . . n). A single position correction can be derived by combining these corrections. A number of options are available, ranging from simple averaging:

$$\Delta \theta = \frac{1}{n} \sum_{j=1}^{n} \Delta \theta_j \quad (28)$$

to weighted averaging, with weighting dependent on instantaneous position and current. The second (corrected) estimate of rotor position at time $k\Delta T$ ($\theta_{e(k)}$) is then given by Equation 19.

Finally, considering the FLUX LINKAGE CORRECTION box, the set of flux linkage estimates may be updated by using the corrected position estimate ($\theta_{e(k)}$) to obtain a set of correction $\Delta \psi_{je}$. From Equation 27, with $\Delta i_j=0$ (j=1 . . . n):

$$\Delta \psi_{je} = \left( \frac{\partial \psi_{je}}{\partial \theta} \right) \cdot \Delta \theta \quad (29)$$

from which updated estimates of flux linkage can be determined and passed to the INTEGRATOR box.

It will be appreciated from the foregoing that the present invention requires some form of representation of various functions (for example, $\psi$ as a function of i and $\theta$) to be predetermined and then stored. The functions can be predetermined, for instance, by making the motor act as a generator and measuring the motional electromotive force which appears across the motor terminals. The representation of the function may, for instance, be a look-up table, or (if the function is amenable to such treatment) a Fourier series representation; the function may even be simply sinusoidal or trapezoidal, in which case its representation is trivial.

EXAMPLES

Experimental results obtained using the techniques of the present invention are now described with reference to FIGS. 4 and 5. The experiments were carried out on a commercial permanent-magnet brushless servo motor drive, with the following parameters:

phase inductance (L)=3.12 mH phase resistance (R)=0.8 $\Omega$ motor and load inertia (J)=0.008 kg.m$^2$ no. motor poles pairs (p)=4 peak phase flux linkages due to the permanent magnet=71 mWb.t

Measurements of phase voltage, phase current and rotor position were recorded at intervals of 10 $\mu$s as the drive accelerated from rest. The captured data was processed off-line using the techniques described above, thus allowing a comparison of the estimated and actual rotor position to be made.

FIGS. 4 show experimental results for a motor operated without current control and with a rectangular voltage waveform applied to each phase. The waveform in FIG. 4a shows the voltage appearing across one phase and consists of constant voltage intervals, when the phase is excited, and intervals with near-constant slope, reflecting the magnet-induced electromotive force (emf), while the phase is unexcited. In the corresponding current waveform (FIG. 4b) the current amplitude reduces between successive excitation intervals as the motor accelerates, causing the magnet-induced emf to increase in magnitude. FIG. 4c shows the phase flux linkage estimate obtained by integrating (v-Ri) with respect to time for one phase, using the data shown in FIGS. 4a and 4b. As might be expected, the flux linkage characteristic is dominated by the permanent-magnet, which produces a sinusoidal variation. Superimposed on this variation, however, are step changes caused by phase switching. Corrected estimates of phase flux linkage, produced by the technique's application to the measured data, are shown in FIG. 4d. For this particular set of results there exist only very small differences between the results in FIGS. 4c and 4d. The final two waveforms (FIGS. 4e and 4f) show measured and estimated rotor position as a function of time. Again there is very close agreement between these two sets of results, demonstrating that the position estimation technique is effective over the full speed range of the drive.

Figure 5A:
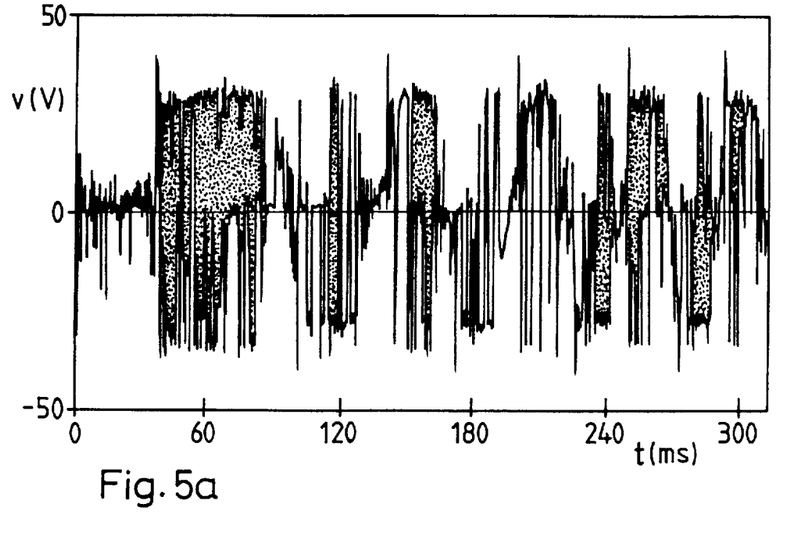
FIGS. 5 show experimental results for the same electric motor but with current control.
Figure 5B:
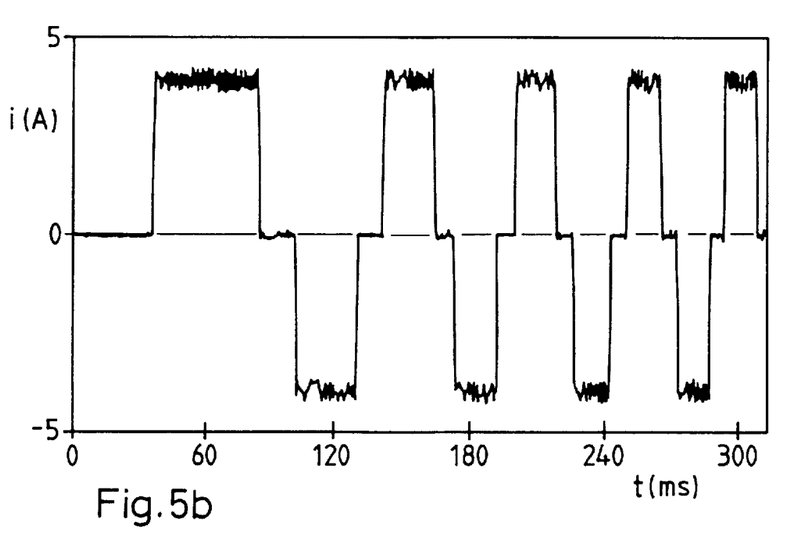
Figure 5C:
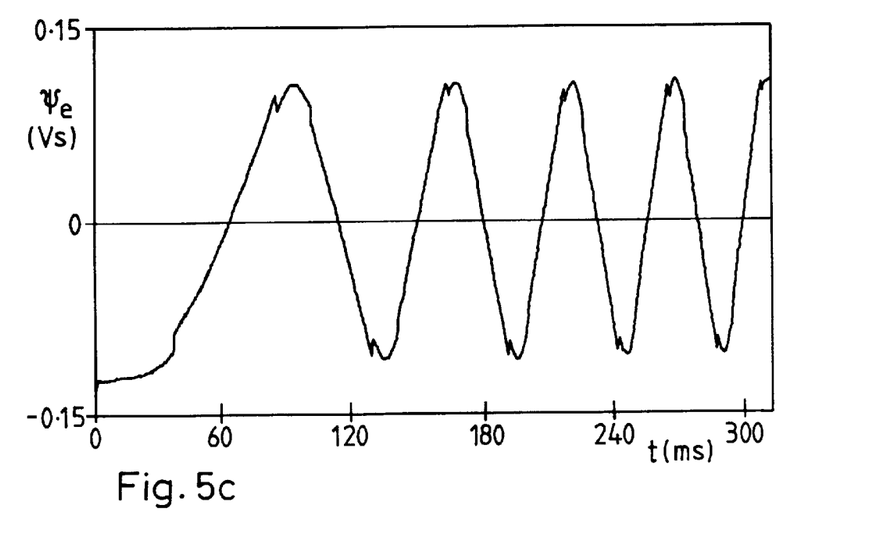
Figure 5D:
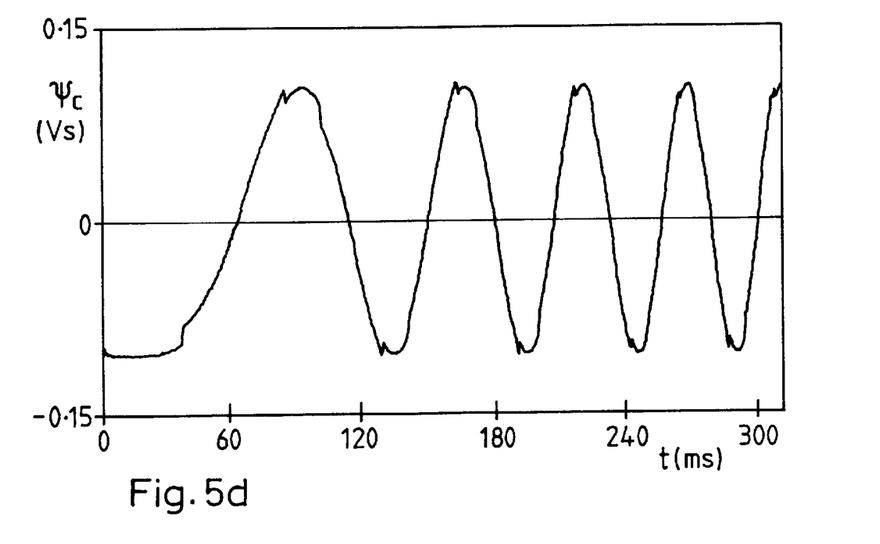
Figure 5E:
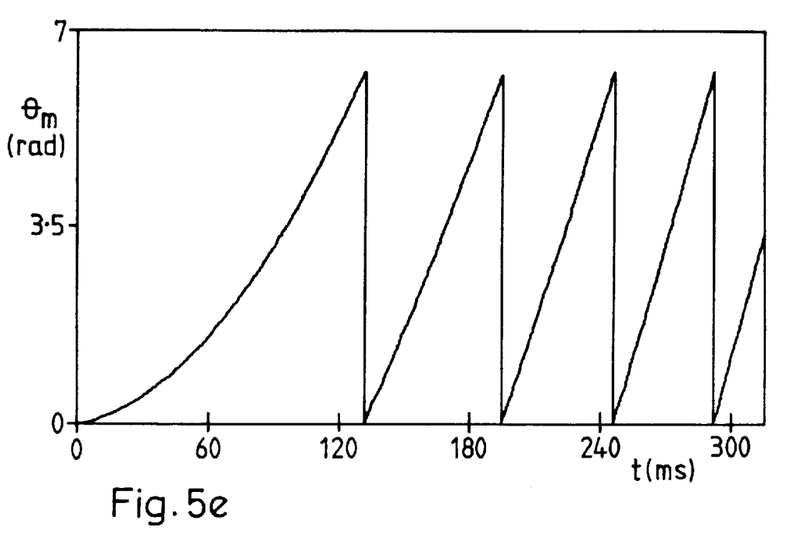
Figure 5F:
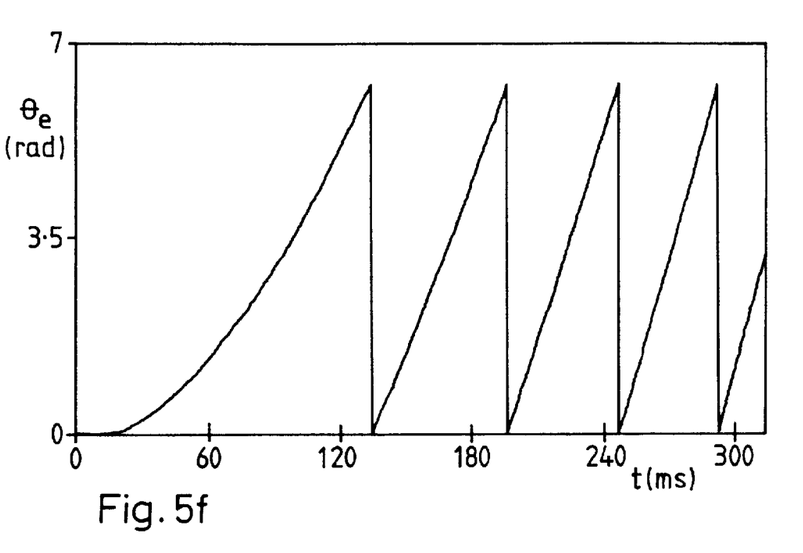

FIGS. 5 show a similar set of results, but with a closed loop current controller causing modulation of the phase voltage (FIG. 5a) to maintain the current constant in excited phases (FIG. 5b). The drive accelerates from rest at a lower rate than in FIG. 4, since current levels are lower, and the position estimation technique again operates effectively (FIG. 5f).

EFFECTS OF MEASUREMENT ERRORS AND PARAMETER DEVIATIONS

The possible effects of measurement errors and parameter deviations on the quality of the results obtained using the present invention are now considered. Since the invention is implemented by calculating the flux linkage from the phase voltage and current, the performance of the invention depends on the quality and accuracy of the estimated flux linkages and measured currents. In addition to this, parameter deviations due to variations in temperature and saturation need to be considered.

Error terms in the flux linkage estimation and flux linkage variables due to measurement error and parameter variation may be expressed as follows:

$$\psi = \int (v - Ri) dt + e_1$$
$$\psi = Li - \lambda_m(\theta) + e_2 \qquad (30)$$

where $e_1$ and $e_2$ are the errors due to measurement and parameter deviations respectively. The corruption sources on the flux linkage estimation may be classified under term $e_1$ as follows:

1. Measurement errors in the terminal quantities:
    (a) phase shift in the measured values due to inaccuracies in the measurement system,
    (b) magnitude error due to conversion factors and gain,
    (c) offset in the measurement system, and
    (d) quantization error in the digital system.
2. Temperature effect on the winding resistance R.

The error term $e_1$ in Equations 30 mainly includes measurement errors. In both voltage and current measurement, one has to ensure that the measurement devices will not introduce a phase shift, offset or magnitude error. Another problem in the measurement system is the potentially noisy connection to the computer for carrying out the digital signal processing. The sensitive analog front end of the measurement devices can also be corrupted by a noisy computer connection. One solution is to place an isolation amplifier between the computer and the measurement system. However, the isolation amplifier could limit the performance of the system, particularly for high frequency measurements.

Moreover, in star-connected systems, if the current regulation in the third phase is reconstructed from the regulation in the other two phases, errors in the third phase current might be increased. The error in flux linkage estimation is mainly due to measurement errors, but it may not be separable from deviations in the winding resistance R.

The error term $e_2$ also includes current measurement error. However, it is mainly influenced by deviations in magnet flux linkage and winding inductance. For motors which have a large air gap, saturation effects caused by current level may be ignored. Otherwise, magnetic saturation can be taken into account in the manner described earlier. Deviations in the magnet flux linkages and changing back emf constant with temperature may also need to be taken into account.

The effects of parameter variations have been studied pursuant to the present invention with reference to initially measured motor parameters. In order to check the ability of the technique to perform in the presence of parameter variations, a test has been carried out changing the value of the winding resistance, the back emf constant, and the winding inductance within a ±10% range. It was found that changing the resistance value caused a small phase shift and noticeable dc offset in the estimated flux linkage waveform which could be overcome by the flux linkage correction. In one typical test, a change of 10% in the resistance of the windings caused a 0.7% error in rotor position during constant speed operation.

Changing the back emf constant caused a difference between estimated and corrected flux linkage. This deviation could be recovered by flux linkage correction. In a typical test, a 10% change in the back emf constant caused a 0.8% error in rotor position during constant speed operation.

Neither changing the value of the inductance nor changing the offset effect introduced any noticeable position error. However, again, any small errors can be eliminated by flux linkage correction.

It will be understood that the present invention has been described above purely by way of example, and that modifications of detail can be made within the scope of the invention.

I claim:

1. A method of determining a rotor displacement parameter of the rotor of an electric motor, the method comprising the steps of:
    measuring electrical characteristics of the motor at given instants;
    obtaining a first estimate of said parameter on the basis of values of the parameter at previous instants;
    obtaining an estimate of at least one of the electrical characteristics on the basis of said first estimate of said parameter and the measured electrical characteristics; and,
    obtaining a corrected estimate of said parameter by correcting said first estimate of said parameter on the basis of the difference between said estimate of at least one of the electrical characteristics and the measured value of said at least one electrical characteristic.

2. A method according to claim 1, wherein said measured electrical characteristics comprise the voltage and current of a phase of the electric motor, said at least one electrical characteristic being the phase current, and comprising the step of:
    obtaining an estimate of the phase flux linkage on the basis of said measured voltage and current;
    said estimate of the phase flux linkage being used with the first estimate of said parameter to provide the estimate of the phase current.

3. A method according to claim 2, comprising the further step of:
    correcting the estimate of the phase flux linkage on the basis of the difference between the corrected estimate of said parameter and said first estimate of said parameter;
    said corrected estimate of the phase flux linkage being used to provide the estimate of the phase current.

4. A method according to claim 2, comprising the further step of:
    correcting the estimate of the phase flux linkage on the basis of the difference between the measured value of the phase current and the estimated value of the phase current;
    said corrected estimate of the phase flux linkage being used to provide the estimate of the phase current.

5. A method according to claim 1, wherein the first estimate of said parameter is obtained on the basis of the values of the parameter at the three immediately preceding instants.

6. A method according to claim 5, wherein the updated value is predicted in accordance with an equation of the form $a_k = 3a_{k-1} - 3a_{k-2} + a_{k-3}$, where $a_k$ is the updated value, and $a_{k-1}$, $a_{k-2}$ and $a_{k-3}$ are the values of the parameter at three preceding instants.

7. A method according to any one of claims 1 to 6, wherein said parameter is the angular displacement of the rotor.

8. A method of determining a rotor displacement parameter for an electric motor, the method comprising the steps of:
    measuring an electrical characteristic of the motor at a given instant;
    predicting a value representative of flux linkage from the characteristic;

correcting the predicted flux linkage value in dependence on the difference between the actual value of the characteristic and a value estimated using the predicted flux linkage value; and, determining the rotor displacement parameter using the corrected flux linkage value.

9. A method according to claim 8, wherein the correction is determined in dependence on said difference multiplied by the differential of flux linkage with respect to current.

10. A method according to claim 8 or claim 9, wherein the correction is determined from the difference between the actual and estimated values of such electrical characteristic for a plurality of phases of the motor.

11. A method according to claim 8, wherein values representative of the non-linear variation of flux linkage with current are stored and employed in the determination of the parameter value.

12. A method according to claim 11, wherein a value representative of current is estimated from flux linkage according to said stored representative values, and the parameter value is determined in dependence on the estimated current value.

13. A method according to claim 1 or claim 8, for determining the rotor displacement parameter for an electric motor having a plurality of windings sharing a common connection, wherein the electrical characteristics are measured from points other than the common connection.

14. A method of controlling an electric motor, wherein the motor is controlled in dependence on the value of the rotor displacement parameter determined in accordance with claim 1 or claim 8.

15. Apparatus for determining a rotor displacement parameter of a rotor of an electric motor, the apparatus comprising:

means for measuring electrical characteristics of the motor at given instants;

means for obtaining a first estimate of said parameter on the basis of values of the parameter at previous instants;

means for obtaining an estimate of at least one of the electrical characteristics on the basis of said first estimate of said parameter and the measured electrical characteristics; and, means for obtaining a corrected estimate of said parameter by correcting said first estimate of said parameter on the basis of the difference between said estimate of at least one of the electrical characteristics and the measured value of said at least one electrical characteristic.

16. Apparatus for determining a rotor displacement parameter of a rotor of an electric motor, the apparatus comprising:

means for measuring the voltage and current of a phase of an electric motor at given instants;

means for obtaining a first estimate of said parameter on the basis of values of the parameter at previous instants;

means for obtaining an estimate of the phase flux linkage on the basis of said measured voltage and current;

means for obtaining an estimate of the phase current on the basis of said first estimate of said parameter and the estimate of the phase flux linkage; and, means for obtaining a corrected estimate of said parameter by correcting said first estimate of said parameter on the basis of the difference between said estimate of the phase current and the measured value of the phase current.

17. Apparatus for determining a rotor displacement parameter for an electric motor, the apparatus comprising:

means for measuring an electrical characteristic of the motor at a given instant;

means for predicting a value representative of flux linkage from the characteristic;

means for correcting the predicted flux linkage value in dependence on the difference between the actual value of the characteristic and a value estimated using the predicted flux linkage value; and, means for determining the rotor displacement parameter using the corrected flux linkage value.

18. Apparatus according to claim 17, wherein the correcting means is arranged to determine the correction in dependence on said difference multiplied by the differential of flux linkage with respect to current.

19. Apparatus according to claim 17 or claim 18, wherein the determining means is arranged to determine the parameter in dependence on the differentials with respect to current of the flux linkages for a plurality of phases of the motor.

20. Apparatus according to claim 17, comprising means for storing values representative of the non-linear variation of flux linkage with current, said values being employed by the determining means in the determination of the parameter value.

21. Apparatus for controlling an electric motor, including means for controlling a motor in dependence on the value of a rotor displacement parameter and apparatus for determining the rotor displacement parameter according to claim 15.

* * * * *